(12) United States Patent
Cole et al.

(10) Patent No.: US 8,271,754 B2
(45) Date of Patent: Sep. 18, 2012

(54) SIMPLE PRECONFIGURED CLIENT MANAGEMENT FAILSAFE

(75) Inventors: Terry L. Cole, Austin, TX (US); Paul W. Vancil, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 268 days.

(21) Appl. No.: 12/573,304

(22) Filed: Oct. 5, 2009

(65) Prior Publication Data

US 2011/0082990 A1 Apr. 7, 2011

(51) Int. Cl.
  *G06F 13/00* (2006.01)
  *G06F 9/00* (2006.01)
  *G06F 11/10* (2006.01)

(52) U.S. Cl. ............ 711/162; 711/E12.103; 713/2; 714/E11.132; 714/E11.133

(58) Field of Classification Search ............ 711/162, 711/E12.103; 713/2; 714/E11.132, E12.133, 714/E11.133
See application file for complete search history.

(56) References Cited

U.S. PATENT DOCUMENTS

| | | | | |
|---|---|---|---|---|
| 5,784,549 A * | 7/1998 | Reynolds et al. | | 714/24 |
| 6,529,966 B1 * | 3/2003 | Willman et al. | | 710/10 |
| 6,757,824 B1 * | 6/2004 | England | | 713/156 |
| 6,931,519 B1 * | 8/2005 | Keller | | 713/1 |
| 7,543,183 B2 * | 6/2009 | Vrhel et al. | | 714/26 |
| 2004/0153724 A1 * | 8/2004 | Nicholson et al. | | 714/6 |

* cited by examiner

*Primary Examiner* — Kevin Ellis
*Assistant Examiner* — Mehdi Namazi
(74) *Attorney, Agent, or Firm* — Hamilton & Terrile, LLP; Gary W. Hamilton

(57) ABSTRACT

A system, method and computer-usable medium are disclosed for recovering data from a memory storage device. The operating system (OS) of an IPS comprising a source memory storage device, further comprising stored data, is monitored to detect a defective operating state. If a defective operating state of the OS is detected, then operation of the IPS is terminated, followed by the initiation of IPS boot operations to recover data from the source memory storage device. The OS is bypassed, and initial boot operations are performed from a management controller or from the BIOS of the IPS. Additional boot operations are performed, and once the IPS has been brought to an operative state, a data recovery module is used to transfer data from the source memory storage device to a target storage device.

20 Claims, 4 Drawing Sheets

SIMPLE PRECONFIGURED CLIENT MANAGEMENT FAILSAFE

BACKGROUND OF THE INVENTION

1. Field of the Invention

Embodiments of the invention relate generally to information processing systems. More specifically, embodiments of the invention provide a system, method and computer-usable medium for recovering data from a memory storage device.

2. Description of the Related Art

Consumers, small business owners, and employees of large corporations typically view their computing devices as commodities that are more easily and more cheaply replaced than repaired. However, this is not the case with their data, which they view as valuable and worth protecting. Numerous solutions for backing up and archiving data exist, many of which are easy to use or even automated. Nonetheless, many individuals and companies fail to adequately protect their data, despite the value it represents. As a result, the need to recover data from a crashed system is not uncommon.

However, system recovery efforts often begin with reinstalling the OS, which generally overwrites all data on the hard disk. As a result, reinstalling the OS is not a viable data recovery option unless the user's data has been stored on a separate storage partition. Even so, reinstalling the OS can still be time consuming, error-prone, and tedious. Alternatively, a variety of tools exist for repairing a crashed disk image without reinstalling the OS, but there is no guarantee that the user's data will not be lost or corrupted in the course of using these tools.

As a result, users would typically prefer to get a copy of their data from the crashed system before such repairs are attempted. One option is to remove the affected disk drive and install it on a different machine. Once installed, the data can then be transferred to another storage device. However, this approach assumes that another machine is available and the user has the knowledge and skill to remove and reinstall a disk drive. If not, then the user would typically be required to pay a third party. In either case, the process can be as time consuming, error-prone, and tedious as reinstalling the OS. In view of the foregoing, there is a need for recovering a copy of user data from a memory storage device before system recovery or repairs are attempted.

SUMMARY OF THE INVENTION

A system, method and computer-usable medium are disclosed for recovering data from a memory storage device. In various embodiments, an information processing system (IPS) comprises a source memory storage device, further comprising stored data. In these and other embodiments, the operating system (OS) of the IPS is monitored to detect a defective operating state. If a defective operating state of the OS is detected, then operation of the IPS is terminated, followed by the initiation of IPS boot operations to recover data from the source memory storage device. In one embodiment, initial boot operations are performed from a management controller, which bypasses the OS to bring the IPS to an operative state. In another embodiment, the OS of the IPS is likewise bypassed and the initial boot operations are performed by the Basic Input-Output System (BIOS) of the IPS.

In various embodiments, additional boot operations are performed once the IPS has been brought to an operative state. In one embodiment, the additional boot operations are performed using boot data stored in a service partition of the source memory storage device. In another embodiment, the additional boot operations are performed using boot data stored in a service partition of a target data recovery memory storage device, such as a flash memory device or a hard drive. In various embodiments, the flash memory device or the hard drive are coupled to the IPS through a universal serial bus (USB) port. In one embodiment, the additional boot operations are performed using boot data associated with a virtual machine running on a virtual machine host. In another embodiment, the additional boot operations are performed using boot data stored on a network-attached IPS. In yet another embodiment, the additional boot operations are performed using boot data stored on a network-attached memory storage device, such as a storage area network (SAN).

Once boot operations are completed, then a data recovery module is used by a user to perform data recovery operations. In various embodiments, a data recovery module user interface (UI) is used by the user for the data recovery operations. In various embodiments data is transferred from the source memory storage device to the target memory storage device, whether directly or indirectly coupled to the IPS. In one embodiment, the data is transferred file-by-file. In another embodiment, the data is transferred directory-by-directory. In yet another embodiment, data is transferred in a compressed format. In still another embodiment, data is transferred as a data image.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A system, method and computer-usable medium are disclosed for recovering data from a memory storage device.

Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. Some portions of the detailed descriptions provided herein are presented in terms of algorithms and instructions that operate on data that is stored in a computer memory. Such descriptions and representations are used by those skilled in the art to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that, throughout the description, discussions using terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
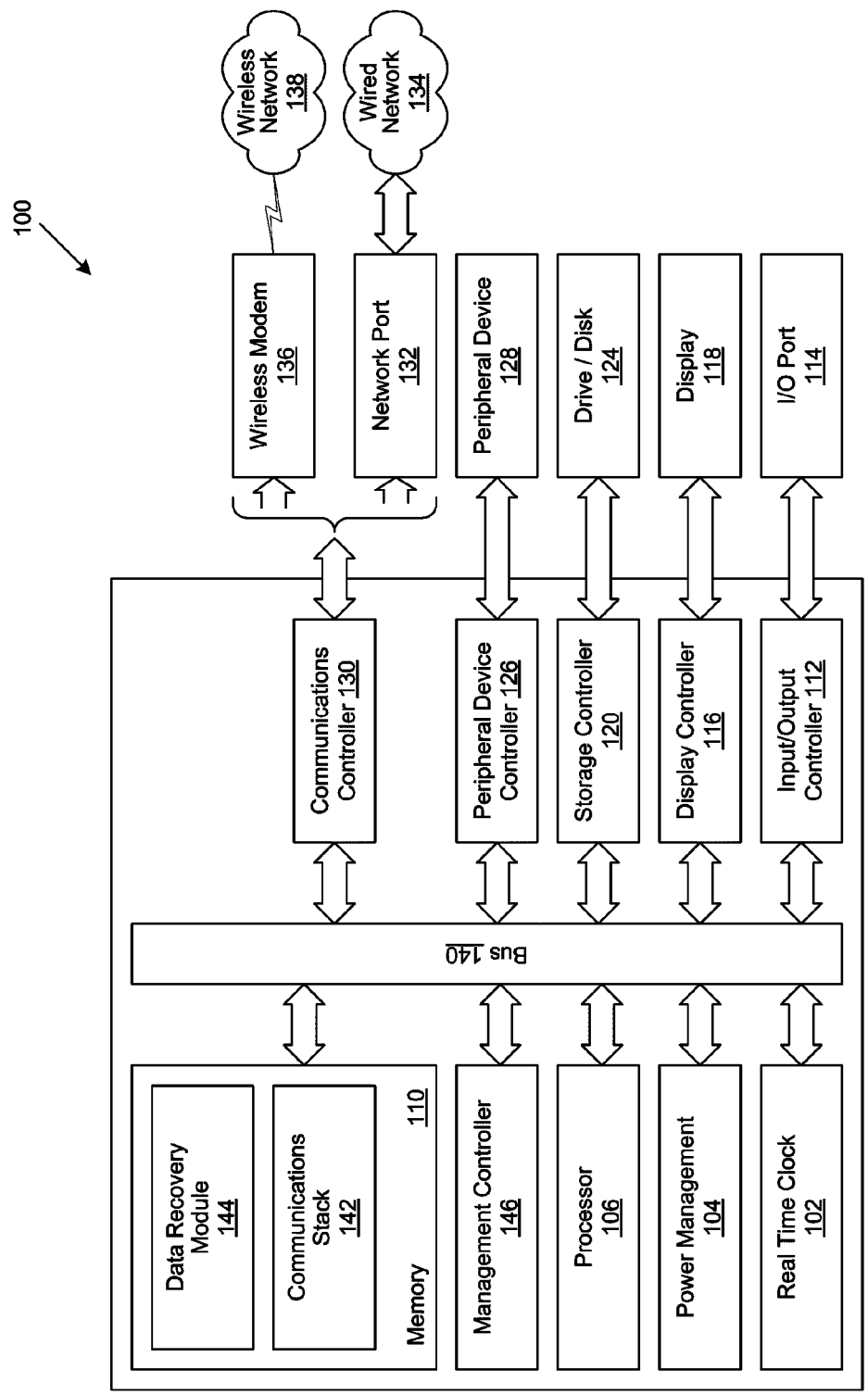
FIG. 1 is a generalized block diagram illustrating an information processing system as implemented in accordance with an embodiment of the invention.

FIG. 1 is a generalized block diagram illustrating an information processing system 100 as implemented in accordance with an embodiment of the invention. System 100 comprises a real-time clock 102, a power management module 104, a processor 106, memory 110, and a management controller 146, all physically coupled via bus 140. In various embodiments, memory 110 comprises volatile random access memory (RAM), non-volatile read-only memory (ROM), non-volatile flash memory, or any combination thereof. In one embodiment, memory 110 also comprises communications stack 142 and a data recovery module 144.

Also physically coupled to bus 140 is an input/out (I/O) controller 112, further coupled to a plurality of I/O ports 114. In different embodiments, I/O port 114 may comprise a keyboard port, a mouse port, a parallel communications port, an RS-232 serial communications port, a gaming port, a universal serial bus (USB) port, an IEEE1394 (Firewire) port, or any combination thereof. Display controller 116 is likewise physically coupled to bus 140 and further coupled to display 118. In one embodiment, display 118 is separately coupled, such as a stand-alone, flat panel video monitor. In another embodiment, display 118 is directly coupled, such as a laptop computer screen, a tablet PC screen, or the screen of a personal digital assistant (PDA). Likewise physically coupled to bus 140 is storage controller 120 which is further coupled to mass storage devices such as a tape drive or hard disk 124. Peripheral device controller is also physically coupled to bus 140 and further coupled to peripheral device 128, such as a random array of independent disk (RAID) array or a storage area network (SAN).

In one embodiment, communications controller 130 is physically coupled to bus 140 and is further coupled to network port 132, which in turn couples the information processing system 100 to one or more physical networks 134, such as a local area network (LAN) based on the Ethernet standard. In other embodiments, network port 132 may comprise a digital subscriber line (DSL) modem, cable modem, or other broadband communications system operable to connect the information processing system 100 to network 134. In these embodiments, network 134 may comprise the public switched telephone network (PSTN), the public Internet, a corporate intranet, a virtual private network (VPN), or any combination of telecommunication technologies and protocols operable to establish a network connection for the exchange of information.

In another embodiment, communications controller 130 is likewise physically coupled to bus 140 and is further coupled to wireless modem 136, which in turn couples the information processing system 100 to one or more wireless networks 138. In one embodiment, wireless network 138 comprises a personal area network (PAN), based on technologies such as Bluetooth or Ultra Wideband (UWB). In another embodiment, wireless network 138 comprises a wireless local area network (WLAN), based on variations of the IEEE 802.11 specification, often referred to as WiFi. In yet another embodiment, wireless network 138 comprises a wireless wide area network (WWAN) based on an industry standard including two and a half generation (2.5G) wireless technologies such as global system for mobile communications (GPRS) and enhanced data rates for GSM evolution (EDGE). In other embodiments, wireless network 138 comprises WWANs based on existing third generation (3G) wireless technologies including universal mobile telecommunications system (UMTS) and wideband code division multiple access (W-CDMA). Other embodiments also comprise the implementation of other 3G technologies, including evolution-data optimized (EVDO), IEEE 802.16 (WiMAX), wireless broadband (WiBro), high-speed downlink packet access (HSDPA), high-speed uplink packet access (HSUPA), and emerging fourth generation (4G) wireless technologies.

Figure 2:
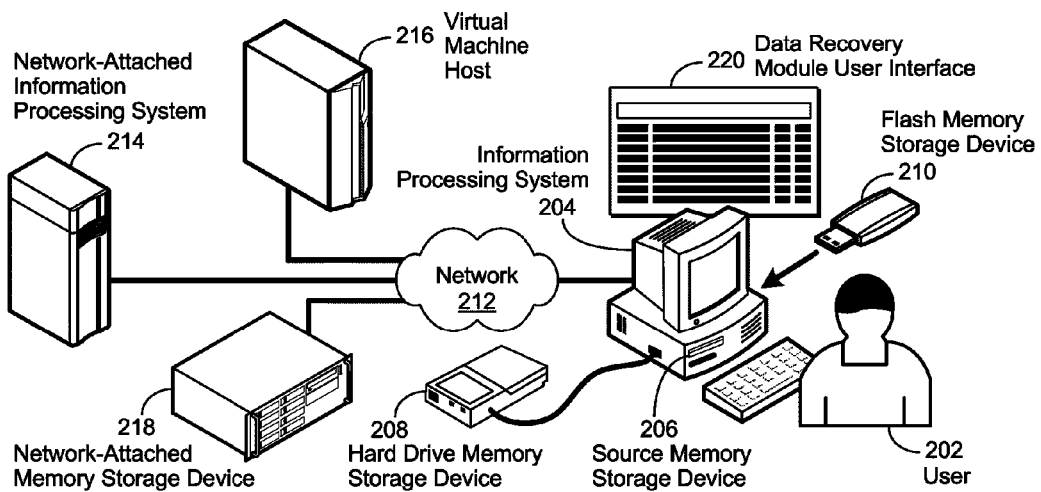
FIG. 2 is a simplified block diagram of a data recovery module as implemented in accordance with an embodiment of the invention for the recovery of data from memory storage device.

FIG. 2 is a simplified block diagram of a data recovery module as implemented in accordance with an embodiment of the invention for the recovery of data from memory storage device. In various embodiments, an information processing system (IPS) comprises a source memory storage device 206, further comprising stored data. In these and other embodiments, the operating system (OS) of the IPS 204 is monitored to detect a defective operating state. In various embodiments, the data recovery module comprises processing logic operable to detect the defective operating state of the information processing system's 204 OS. If a defective operating state of the OS is detected, then operation of the IPS 204 is terminated, followed by the initiation of IPS 204 boot operations to recover data from the source memory storage device. In one embodiment, initial boot operations are performed from a management controller, which bypasses the OS of the IPS 204 to bring the IPS 204 to an operative state. As an example, a non-X86 processor, distinct from the primary X86 processor core(s) of the IPS 204, may be implemented on a Southbridge controller. In this example, the non-X86 processor would be operable to perform the data access and data recovery operations described in greater detail herein. In one embodiment, the IPS 204 comprises a bus, which couples the management controller to the primary processor core(s) of the IPS and to a source memory storage device 206. In another embodiment, the OS of the IPS 204 is likewise bypassed and the initial boot operations are performed by the Basic Input-Output System (BIOS) of the IPS 204 to bring the IPS 204 to an operative state.

In various embodiments, additional boot operations are performed once the IPS 204 has been brought to an operative state. In one embodiment, the additional boot operations are performed using boot data stored in a service partition of the source memory storage device 206. In various embodiments, the source memory storage device may comprise a hard drive, a tape drive, a flash memory drive, or any combination of memory technologies operable to store data.

In another embodiment, the additional boot operations are performed using boot data stored in a service partition of a target data recovery memory storage device, such as a flash memory storage device 210 or a hard drive memory storage device 218. In various embodiments, the flash memory storage device 210 or the hard drive memory storage device 218 are coupled to the IPS 204 through a universal serial bus (USB) port.

In one embodiment, the additional boot operations are performed using boot data associated with a virtual machine running on a virtual machine host 216, which is connected to IPS 204 over a network connection to network 212. In another embodiment, the additional boot operations are performed using boot data stored on a network-attached IPS 214, such as a storage area network (SAN), likewise connected IPS 204 over a network connection to network 212. In yet another embodiment, the additional boot operations are performed using boot data stored on a network-attached memory storage device 218, which is likewise connected IPS 204 over a network connection to network 212.

Once boot operations are completed, then the data recovery module is used by the user 202 to perform data recovery operations. In various embodiments, a data recovery module user interface (UI) 220 is used by the user 202 for the data recovery operations. In various embodiments data is transferred from the source memory storage device 206 to the target memory storage device 208, 210, 214, 216, 218 directly or indirectly coupled to the IPS 204. In one embodiment, the data is transferred file-by-file. In another embodiment, the data is transferred directory-by-directory. In yet another embodiment, data is transferred in a compressed format. In still another embodiment, data is transferred as a data image familiar to those of skill in the art.

Figure 3:
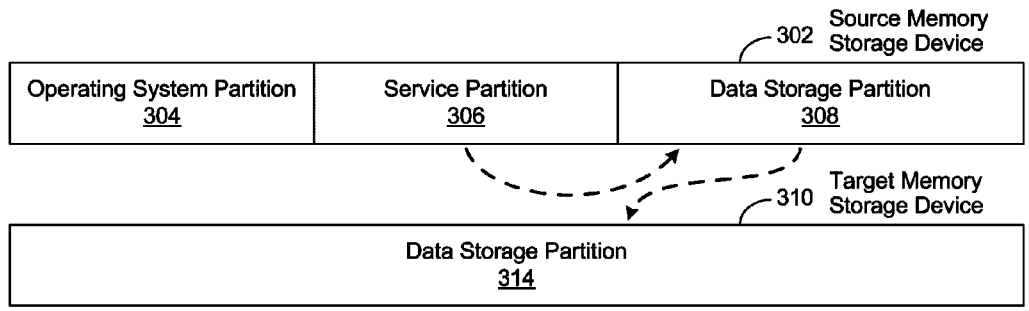
FIG. 3 is a simplified block diagram of a data recovery module as implemented in a service partition of source memory storage device.

FIG. 3 is a simplified block diagram of a data recovery module as implemented in a service partition of source memory storage device. In this embodiment, a source memory storage device 302 comprises an operating system (OS) partition 304, a service partition 306, and a first data storage partition 308. A target memory storage device 310 comprises a second data storage partition 314. In various embodiments, boot operations as described in greater detail herein are performed using boot data stored in the service partition 306 of the source memory storage device 302. Once boot operations are completed, data stored in the first data storage partition 308 are transferred to the second data storage partition 314. As an example, an information processing system may comprise an internal hard drive, which is the source memory storage device 302. The OS stored in the operating system partition 304 may become defective. If so, boot data stored in the service partition 306 is then used to bypass the OS while booting the IPS to an operative state as described in greater detail herein. Once the IPS is in an operative state, the data stored in the data storage partition 308 can be transferred to the data storage partition 314 of a target memory storage device 310, such as a flash memory drive attached to the IPS via a Universal Serial Bus (USB) port.

Figure 4:
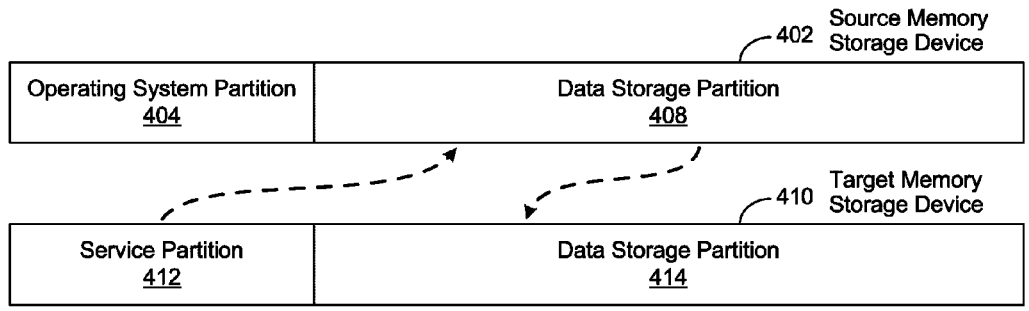
FIG. 4 is a simplified block diagram of a data recovery module as implemented in a service partition of target memory storage device.

FIG. 4 is a simplified block diagram of a data recovery module as implemented in a service partition of target memory storage device. In this embodiment, a source memory storage device 402 comprises an operating system (OS) partition 404 and a first data storage partition 408. A target memory storage device 410 comprises a service partition 412 and a second data storage partition 414. In various embodiments, boot operations as described in greater detail herein are performed using boot data stored in the service partition 412 of the target memory storage device 410. Once boot operations are completed, data stored in the first data storage partition 408 are transferred to the second data storage partition 414. As described in the example hereinabove, an information processing system may comprise an internal hard drive, which is the source memory storage device 402. The OS stored in the operating system partition 404 may become defective. If so, boot data stored in the service partition 412 of a target memory storage device 410, such as a hard drive attached to the IPS via a Universal Serial Bus (USB) port. The boot data is used to bypass the OS while booting the IPS to an operative state as described in greater detail herein. Once the IPS is in an operative state, the data stored in the data storage partition 408 can be transferred to the data storage partition 414 of a target memory storage device 410.

Figure 5A:
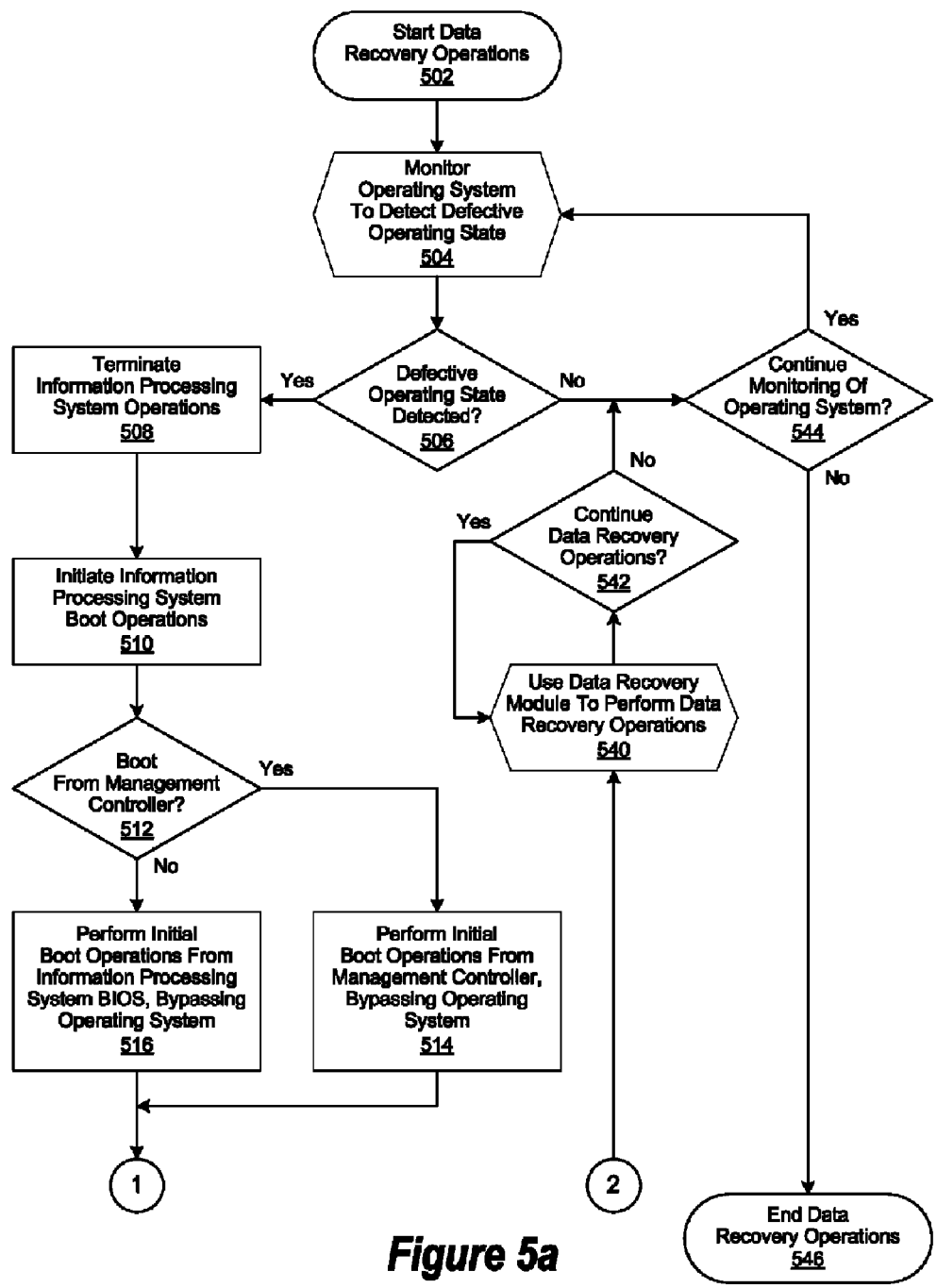
FIGS. 5a-b are a generalized flow chart of the operation of a data recovery module as implemented in accordance with an embodiment of the invention for the recovery of data from memory storage device.
Figure 5B:
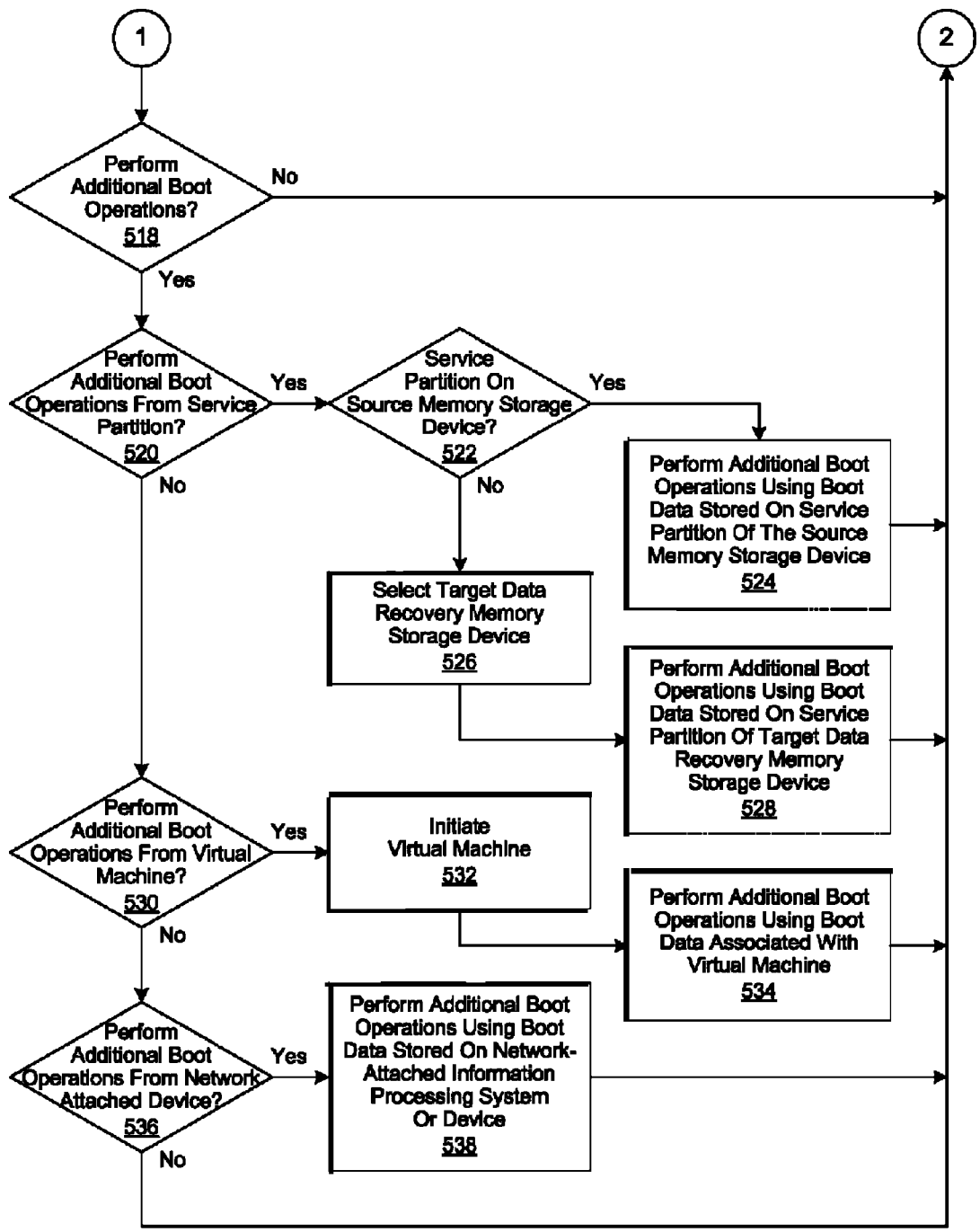

FIGS. 5*a-b* are a generalized flow chart of the operation of a data recovery module as implemented in accordance with an embodiment of the invention for the recovery of data from memory storage device. In this embodiment, data recovery operations are begun in step 502, followed by the monitoring of the operating system (OS) of an information processing system (IPS) to detect a defective operating state. In various embodiments, the data recovery module comprises processing logic operable to detect the defective operating state of the information processing system's OS. A determination is then made in step 506 whether a defective operating state of the OS has been detected. If not, then a determination is made in step 544 whether to continue monitoring the operating state of the OS. If so, the process is continued, proceeding with step 504. Otherwise, data recovery operations are ended in step 546.

However, if a defective operating state of the OS is detected in step 506, then IPS operations are terminated in step 508, followed by the initiation of IPS boot operations in step 510. A determination is then made in step 512 whether to perform initial boot operations from a management controller. As an example, a non-X86 processor, distinct from the primary X86 processor core(s) of the IPS, may be implemented on a Southbridge controller. In this example, the non-X86 processor would be operable to perform the data access and data recovery operations described in greater detail herein. In one embodiment, the IPS comprises a bus, which couples the management controller to the primary processor core(s) of the IPS and to a source memory storage device.

If it is determined in step 512 to perform initial boot operations from a management controller, then the OS of the IPS is bypassed and they are performed from the management controller in step 514 to bring the IPS to an operative state. Otherwise, the OS of the IPS is bypassed and the initial boot operations are performed by the Basic Input-Output System (BIOS) of the IPS in step 516 to bring the IPS to an operative state. Once the IPS has been brought to an operative state in either step 514 or 516, then a determination is made in step 518 whether to perform additional boot operations.

If so, then a determination is made in step 520 whether the additional boot operations are to be performed using boot data stored in a service partition of a memory storage device. If so, then a determination is made in step 522 whether the service partition is on the source memory storage device. If so, then the additional boot operations are performed in step 524 using boot data stored in the service partition of the source memory storage device. However, if it is determined in step 522 that the service partition is not on the source memory storage device, then a target data recovery memory storage device is selected in step 526. The additional boot operations are then performed in step 528 using boot data stored in the service partition of the target data recovery memory storage device.

However, if it was determined in step 520 to not perform additional boot operations using boot data stored in a service partition, then a determination is made in step 530 whether to perform additional boot operations using boot data associated with a virtual machine. If so, then a virtual machine is initiated in step 532 using processes and operations familiar to skilled practitioners of the art. The additional boot operations are then performed in step 533 using boot data associated with the virtual machine. However, if it was determined in step 530 not to perform additional boot operations with a virtual machine, then a determination is made in step 530 whether to perform additional boot operations using boot data stored on a network-attached IPS or memory storage device. If so, then the additional boot operations are performed in step 538 using boot data stored on the network-attached IPS or memory storage device.

Otherwise, or if it is determined in step 518 to not perform additional boot operations, or once additional boot operations are performed in steps 524, 528, 534, or 538, then the data recovery module is used in step 540 to perform data recovery operations. In various embodiments data is transferred from the source memory storage device to the target memory storage device. In one embodiment, the data is transferred file-by-file. In another embodiment, the data is transferred directory-by-directory. In yet another embodiment, data is transferred in a compressed format. In still another embodiment, data is transferred as a data image familiar to those of skill in the art. A determination is then made in step 542 whether to continue data recovery operations. If so, the process is continued, proceeding with step 540. Otherwise, the process is continued, proceeding with step 544 as described hereinabove.

Skilled practitioners in the art will recognize that many other embodiments and variations of the present invention are possible. In addition, each of the referenced components in this embodiment of the invention may be comprised of a plurality of components, each interacting with the other in a distributed environment. Furthermore, other embodiments of the invention may expand on the referenced embodiment to extend the scale and reach of the system's implementation.

What is claimed is:

1. A system for accessing data, comprising:
    an information processing system (IPS) comprising a processor, and an operating system (OS);
    a first memory storage device comprising a storage partition, wherein said first memory storage device is coupled to said IPS and said storage partition comprises data;
    processing logic operable to:
        detect said OS is in a defective state;
        perform a boot operation with said processor to boot said IPS to an operative state, wherein said OS is bypassed during execution of said boot operation;
        mount said storage partition to access said data; and
        copy said data from said storage partition to a second memory storage device.

2. The system of claim 1, wherein said boot operations are performed by a management controller.

3. The system of claim 2, wherein said IPS comprises a bus, said management controller coupled to said processor and said first memory storage device via said bus.

4. The system of claim 1, wherein said boot operation is performed by a Basic Input Output System (BIOS).

5. The system of claim 4, wherein said first memory storage device further comprises a service partition and said BIOS is operable to boot said IPS using boot data stored on said service partition of said first memory storage device.

6. The system of claim 4, wherein said second memory storage device further comprises a service partition and said BIOS is operable to boot said IPS using boot data stored on said service partition of said second memory storage device.

7. The system of claim 4, wherein said BIOS is operable to generate a virtual machine operable to copy said data from said storage partition to said second memory storage device.

8. A method for accessing data, comprising:
    using an information processing system (IPS) comprising a processor, and an operating system (OS);
    using a first memory storage device comprising a storage partition, wherein said first memory storage device is coupled to said IPS and said storage partition comprises data;
    using processing logic to:
        detect said OS is in a defective state;
        perform a boot operation with said processor to boot said IPS to an operative state, wherein said OS is bypassed during execution of said boot operation;
        mount said storage partition to access said data; and
        copy said data from said storage partition to a second memory storage device.

9. The method of claim 8, wherein said boot operations are performed by a management controller.

10. The method of claim 9, wherein said IPS comprises a bus, said management controller coupled to said processor and said first memory storage device via said bus.

11. The method of claim 8, wherein said boot operation is performed by a Basic Input Output System (BIOS).

12. The method of claim 11, wherein said first memory storage device further comprises a service partition and said BIOS is operable to boot said IPS using boot data stored on said service partition of said first memory storage device.

13. The method of claim 11, wherein said second memory storage device further comprises a service partition and said BIOS is operable to boot said IPS using boot data stored on said service partition of said second memory storage device.

14. The method of claim 11, wherein said BIOS is operable to generate a virtual machine operable to copy said data from said storage partition to said second memory storage device.

15. A computer-usable medium for accessing data, comprising:
    using an information processing system (IPS) comprising a processor, and an operating system (OS);
    using a first memory storage device comprising a storage partition, wherein said first memory storage device is coupled to said IPS and said storage partition comprises data;
    using processing logic to:
        detect said OS is in a defective state;
        perform a boot operation with said processor to boot said IPS to an operative state, wherein said OS is bypassed during execution of said boot operation;
        mount said storage partition to access said data; and
        copy said data from said storage partition to a second memory storage device.

16. The computer-usable medium of claim 15, wherein said boot operations are performed by a management controller.

17. The computer-usable medium of claim 16, wherein said IPS comprises a bus, said management controller coupled to said processor and said first memory storage device via said bus.

18. The computer-usable medium of claim 15, wherein said boot operation is performed by a Basic Input Output System (BIOS).

19. The computer-usable medium of claim 18, wherein said first memory storage device further comprises a service partition and said BIOS is operable to boot said IPS using boot data stored on said service partition of said first memory storage device.

20. The computer-usable medium of claim 18, wherein said second memory storage device further comprises a service partition and said BIOS is operable to boot said IPS using boot data stored on said service partition of said second memory storage device.

* * * * *